(12) United States Patent
Kelly-Rowley et al.

(10) Patent No.: US 7,741,383 B2
(45) Date of Patent: Jun. 22, 2010

(54) VERSATILE PIGMENTED INK-JET INKS WITH IMPROVED IMAGE QUALITY

(75) Inventors: Anne M. Kelly-Rowley, San Diego, CA (US); Zeying Ma, San Diego, CA (US); David M. Mahli, San Diego, CA (US); Peter C. Morris, San Diego, CA (US); John M. Gardner, Virginia Beach, VA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1073 days.

(21) Appl. No.: 11/292,671

(22) Filed: Dec. 2, 2005

(65) Prior Publication Data

US 2007/0126839 A1 Jun. 7, 2007

(51) Int. Cl.
*C09D 11/00* (2006.01)

(52) U.S. Cl. .................. 523/160; 523/200; 523/205; 524/186; 524/556; 106/31.13; 106/31.6; 106/31.75; 106/31.86; 347/100

(58) Field of Classification Search .......... None
See application file for complete search history.

(56) References Cited

U.S. PATENT DOCUMENTS

| | | | |
|---|---|---|---|
| 5,223,026 A | 6/1993 | Schwarz, Jr. | |
| 5,250,109 A | 10/1993 | Chan et al. | |
| 5,281,261 A | 1/1994 | Lin | |
| 5,739,833 A | 4/1998 | Yamazaki et al. | |
| 5,883,157 A | 3/1999 | Yamashita et al. | |
| 6,074,467 A * | 6/2000 | Tabayashi et al. | 106/31.65 |
| 6,087,416 A | 7/2000 | Pearlstine et al. | |
| 6,231,652 B1 | 5/2001 | Koyano et al. | |
| 6,281,267 B2 * | 8/2001 | Parazak | 523/160 |
| 6,459,501 B1 | 10/2002 | Holmes | |
| 6,488,753 B1 | 12/2002 | Ito et al. | |
| 6,500,248 B1 | 12/2002 | Hayashi | |
| 6,500,880 B1 * | 12/2002 | Parazak | 523/160 |
| 6,509,393 B2 | 1/2003 | Malhotra | |
| 6,677,398 B2 * | 1/2004 | Egolf et al. | 524/522 |
| 6,695,443 B2 | 2/2004 | Arita et al. | |
| 6,737,449 B1 | 5/2004 | Yatake | |
| 6,767,090 B2 | 7/2004 | Yatake et al. | |
| 6,802,893 B1 | 10/2004 | Komatsu et al. | |
| 6,899,754 B2 | 5/2005 | Yeh et al. | |
| 2004/0032473 A1 * | 2/2004 | Ishimoto et al. | 347/100 |
| 2004/0110867 A1 * | 6/2004 | McCovick | 523/160 |

FOREIGN PATENT DOCUMENTS

| | | |
|---|---|---|
| EP | 1 088 865 A1 | 4/2001 |
| EP | 1 586 611 A | 10/2005 |

* cited by examiner

*Primary Examiner*—David Wu
*Assistant Examiner*—Vu Nguyen

(57) ABSTRACT

The present invention is drawn to versatile ink-jet inks, ink-jet ink sets, and methods of printing images with improved quality when printed on both glossy coated media and on plain paper. In accordance with these embodiments, an ink-jet ink formulated for printing on plain paper and glossy coated media can comprise a liquid vehicle including water, an organic solvent, and an organic amine; and a polymer-encapsulated, acid-sensitive pigment colorant dispersed the liquid vehicle.

35 Claims, No Drawings

VERSATILE PIGMENTED INK-JET INKS WITH IMPROVED IMAGE QUALITY

FIELD OF THE INVENTION

The present invention relates generally to ink-jet ink compositions, ink-jet ink sets, and methods of printing pigmented ink-jet inks with acceptable image gloss when printed on glossy media, and acceptable image quality when printed on plain paper and other non-glossy media.

BACKGROUND OF THE INVENTION

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. Though there has been great improvement in ink-jet printing, accompanying this improvement are increased demands by consumers in this area, e.g., higher speeds, higher resolution, full color image formation, increased stability, etc. As new ink-jet inks and print engines are developed, there have been several traditional characteristics to consider when evaluating the ink in conjunction with a printing surface or substrate. Such characteristics include edge acuity and optical density of the image on the surface, gloss, black to color bleed control, dry time of the ink on the substrate, adhesion to the substrate, lack of deviation in ink droplet placement, presence of all dots, resistance of the ink after drying to water and other solvents, long term storage stability, and long term reliability without pen material degradation or nozzle clogging. The long term reliability without material degradation or nozzle clogging becomes even more important with the advent of print engines that eject smaller drop volumes. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements One characteristic of ink-jet printing systems that is desirable to achieve is related to print quality, particularly with respect to gloss when printing pigmented inks on glossy media. Often, two inks that are individually glossy when printed alone lose their glossy character when printed as a mixture on a glossy media sheet. Further, many inks that have acceptable appearance on glossy media look poor on non-glossy media such as plain paper. Accordingly, investigations continue into developing ink formulations that can be printed with high image quality, even when ink-jet inks are printed as a mixture on a glossy media sheet, as well as when printed on non-glossy media.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a pigment" includes reference to one or more of such materials.

As used herein, "liquid vehicle" is defined to include liquid compositions that can be used to carry colorants, including pigments, to a substrate. Liquid vehicles are well known in the art, and a wide variety of liquid vehicle components may be used in accordance with embodiments of the present invention. Such liquid vehicles may include a mixture of a variety of different agents, including without limitation, surfactants, co-solvents, buffers, biocides, viscosity modifiers, sequestering agents, stabilizing agents, and water. Though not liquid per se, the liquid vehicle can also carry other solids, such as polymers, UV curable materials, plasticizers, salts, etc.

As used herein, "pigment" refers to a colorant particle which is typically substantially insoluble in the liquid vehicle in which it is used.

"Polymer-encapsulated pigment" or a derivation thereof, refers to pigments that have been at least partially encapsulated or coated with a polymer, including polymers prepared from styrene, methacrylic acid, methacrylate, acrylic acid, and/or acrylate monomers, for example. These polymers can be coated on pigments to terminate the outer shell of the pigment with some charge, thereby creating some repulsive nature that reduces agglomeration of pigment particles within the liquid vehicle. However, these coatings can also be prepared to be acid sensitive so that they destabilize when optionally printed on acidic media.

The term "plain paper" includes any uncoated paper where paper fibers are predominantly present at the outermost printing surface.

The term "glossy" when referring to glossy media, glossy photo paper, etc., includes paper substrates that are coated with a non-paper coating which provides gloss to the surface. Exemplary glossy media includes those coated with inorganic porous particulates, e.g., silica, alumina, clay, etc., and bound together by a polymeric binder. It should be noted that media coated with inorganic particulates is not necessarily glossy. Matte coatings, for example, are not considered to be glossy, whereas semi-glossy to high-gloss coatings are considered to be glossy.

Though the benefits of the ink-jet ink compositions are described herein primarily with respect their performance on both glossy media and plain paper, it should be noted that these inks also perform well on other types of media. For example, non-glossy coated papers do not have the same issues with respect to gloss-loss as when the same inks are printed on glossy media; however, similar general image quality improvements can also be achieved when printing on porous, non-glossy coated media as those achieved when printing on plain paper. In other words, the versatility of the inks of the present invention is merely described and defined in accordance with their performance on both plain paper and glossy media (which are very different types of media), and as such, the inks described herein are not limited to printing on these two particular types of media.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

The term "about" when referring to a numerical value or range is intended to encompass the values resulting from experimental error that can occur when taking measurements.

In accordance with embodiments of the present invention, it has been discovered that when printing pigmented ink-jet inks on plain paper, pigment dispersions with higher acid sensitivity can provide better image quality due, at least in part, to the tendency for the pigments to come out of solution (or destabilize or precipitate) and remain at the surface of the plain paper. This is because plain papers generally have an acidic pH. Even so-called "basic" plain papers have a pH that is lower than 7. Conversely, though there are other advantages to preparing more acid stable pigment dispersions, it has been discovered that high pigment stability does not provide as good of image quality on plain paper. This is because the stability of the pigments does not allow for destabilization at the plain paper surface, and thus, the ink tends to sink more deeply into plain paper and other non-glossy porous media substrates. Though more acid sensitive pigment dispersions are good for printing on plain paper, it turns out that they can be inferior to acid stable pigment dispersions when printing on glossy media, such as inorganic particulate-coated glossy media. This is partly because this type of paper is not typically susceptible to the ink "soaking in" to the media substrate, and thus, acid stable pigments printed on glossy photo papers do not have the same disadvantages as they do when being printed on plain papers. In other words, the advantages gained by using less stable (or acid sensitive) pigment dispersions for printing on plain paper are somewhat lost when printing on glossy media. This problem is particularly exacerbated when printing two pigmented ink-jet inks as a blend on glossy media. For example, it has been discovered that when printing two otherwise glossy inks as a blend on glossy media to form a mixed color, one ink may precipitate with the other resulting in poor gloss. More specifically, one can consider the printing of a magenta ink (dark magenta) and a pale magenta ink (light magenta) on glossy media. Often, these two colors are mixed when printing flesh tones and other similarly colored images in order to minimize grain in the image. However, in mixing these inks, though grain is reduced, lower gloss than either ink printed alone is often realized. This example is extendable to the interaction of many pigmented inks (two or more) when printed together as a mixture to provide an appropriate color. Another common example is the mixture of gray and other colored pigmented inks.

Thus, in accordance with embodiments of the present invention, in order to achieve both good image quality on both plain paper and glossy media, it has been discovered that using acid-sensitive pigment dispersions in ink-jet inks can provide improved image quality on plain paper, and the use of organic amines in one or more of the inks can ameliorate the precipitation that reduces gloss on glossy media. Thus, a single ink that performs well on both plain paper and glossy photo media can be formulated in accordance with these principles.

Without being bound by any particular theory, it is believed that the presence of the organic amine can allow for pigmented inks to flow together better on glossy media, forming a smoother image film that is itself glossy. At the same time, organic amines do not substantially reduce the excellent image quality of printed images using plain paper or non-glossy porous coated paper. Specifically, the use of any non-quaternary organic amine can be functional in accordance with embodiments of the present invention, including small molecule primary, secondary, and tertiary amines; macroamines such as Jeffamines™; and other organic amines that are functional in accordance with embodiments of the present invention. Exemplary organic amines that provide acceptable results include triethanolamine (TEA), 2-amino-2-methyl-1-propanol, 2-dimethylamino-2-methyl-1-propanol, and/or diethanolamine. In one particular embodiment, triethanolamine or derivatives thereof are particularly useful, and can act as a buffer between the dispersed pigment particles from multiple inks, allowing multiple ink drops to blend together in a smooth, more continuous film. With respect to the amount of organic amine that can be added, in one embodiment, the organic amine, such as triethanolamine, can be present in the ink-jet ink at from 0.1 wt % to 5 wt %. In another embodiment, the organic amine can be present in the ink-jet ink at from 0.2 wt % to 2 wt %.

With this in mind, the present invention is drawn to versatile ink-jet inks, ink-jet ink sets, and methods of printing images with improved quality when printed on either glossy coated media and on plain paper. In a first embodiment, an ink-jet ink formulated for printing on plain paper and glossy coated media can comprise a liquid vehicle including water, an organic solvent, and an organic amine; and a polymer-encapsulated, acid-sensitive pigment colorant dispersed the liquid vehicle.

In another embodiment, an ink-jet ink set formulated for printing on plain paper and glossy coated media can comprise a first ink-jet ink and a second ink-jet ink. The first ink-jet ink can comprise a liquid vehicle including water, an organic solvent, and an organic amine; and a polymer-encapsulated, acid-sensitive pigment colorant dispersed the liquid vehicle. The second ink-jet ink can comprise a pigment dispersion that includes an ionic pigment colorant or a pigment colorant associated with an ionic pigment dispersant.

In another embodiment, a method of printing images can comprise jetting a first ink-jet ink onto a media substrate, and jetting a second ink-jet ink onto the media substrate such that the first ink-jet ink and the second ink-jet ink become blended on the media substrate. The first ink-jet ink can comprise a liquid vehicle including water, an organic solvent, and an organic amine; and a polymer-encapsulated, acid-sensitive pigment colorant dispersed the liquid vehicle. The second ink-jet ink can comprise an ionic pigment colorant or a pigment colorant associated with an ionic pigment dispersant.

The invention described herein is directed to improved inks for printing ink-jet images using commercially-available ink-jet printers, such as those manufactured by Hewlett-Packard Company, Palo Alto, Calif. The ink-jet inks of the present invention can include colors such as yellow, cyan, pale cyan, magenta, pale magenta, gray, orange, green, purple, pink, red, blue, black, and other known pigment colors. Typically, the pigments of the present invention can be from about 5 nm to about 10 µm in size, and in one aspect, can be from 10 nm to about 500 nm in size, although sizes outside this range can be used if the pigment can remain dispersed and provide adequate color properties. In one detailed aspect of the present invention, the pigment can comprise from about 0.1 wt % to about 10 wt % of the ink-jet ink composition, and in another embodiment, from about 0.5 wt % to about 8 wt %.

Though any color or type of pigment can be used, color organic pigments or black carbon pigments are exemplified herein in accordance with embodiments of the present invention. In one embodiment, a carbon pigment can be functionalized or encapsulated with a polymeric dispersant. The carbon pigment can be almost any commercially available carbon pigment that provides acceptable optical density and print characteristics. Carbon pigments suitable for use in the present invention include, without limitation, carbon black, graphite, vitreous carbon, charcoal, and combinations thereof. In one aspect of the present invention, the carbon pigment is a carbon black pigment. Such carbon black pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Examples of suitable commercially available carbon blacks include No. 2300, No. 900, MCF88, No. 33, No. 40, No. 45, No. 52, MA&, MA8, No. 2200B, Raven 1255, Regal 400R, Regal 330R, Regal 660 R, Mogul L, Color Black FW1, Color Black FW18, Color Black S170, Color Black S150, Printex 35, and Printex U. Other suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, and CAB-O-JET 300; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V.

Alternatively, organic colored pigments can also be encapsulated with a polymer in accordance with embodiments of the present invention. Exemplary pigments that are suitable for use in accordance with embodiments of the present invention include azo pigments such as azo lake pigments, insoluble azo pigments, and condensed azo pigments; as well as polycyclic pigments such as phthalocyanine pigments; quinacridone pigments, dioxazine pigments, and anthraquinone pigments. Specific pigments that are suitable for use include Pigment Blue 15:3, Pigment Green 36, Pigment Blue 15:6, Pigment Red 177, and/or Pigment Red 208 (from DIC); Pigment Red 168, Pigment Violet 23, Pigment Yellow 155, and/or Pigment Violet 19 (from Clariant); and Pigment Red 254 (from Ciba). Examples of other pigments that can be used include C.I. Pigment Yellow 1, C.I. Pigment Yellow 2, C.I. Pigment Yellow 3, C.I. Pigment Yellow 13, C.I. Pigment Yellow 16, C.I. Pigment Yellow 83, Pigment Yellow 74, Pigment Yellow 138 Pigment Yellow 158, Pigment Yellow 128, Pigment Yellow 151, and the like; C.I. Pigment Red 5, C.I. Pigment Red 7, C.I. Pigment Red 12, C.I. Pigment Red 48 (ca), C.I. Pigment Red 48 (mn), C.I. Pigment Red 57 (Ca), C.I. Pigment Red 112, C.I. Pigment Red 122, and the like; C.I. Pigment Blue 1, C.I. Pigment Blue 2, C.I. Pigment Blue 3, C.I. Pigment Blue 15:3, C.I. Pigment Blue 16, C.I. Pigment Blue 22, C.I. Vat Blue 4, C.I. Vat Blue 6, and the like; TIPURE R-101 available from Dupont; carbon black pigment; and other pigments whose performance properties are satisfactory when formulated for the present invention are considered to be within its scope. Exemplary suitable pigments are disclosed and claimed, for example, in U.S. Pat. No. 5,085,698, entitled "Aqueous Pigmented Inks for Ink Jet Printers"; U.S. Pat. No. 5,221,334, entitled "Aqueous Pigmented Inks for Ink Jet Printers"; and U.S. Pat. No. 5,302,197, entitled "Ink Jet Inks", all assigned to E.I. Du Pont de Nemours and Company.

Manufacturers of pigments that provide suitable pigments, some of which have been previously listed, include DIC, Cabot, Orient, BASF, Ciba, and Clariant.

Each of the above-described pigments can be encapsulated by a copolymeric dispersant. For example, in one embodiment, the polymer encapsulated and acid sensitive pigment colorant can be encapsulated with a styrene copolymer, an acrylic acid or acrylate copolymer, a methacrylic acid or methacrylate copolymer, combination thereof, etc. In one embodiment, the copolymer can be styrene-acrylic acid-methacrylic acid copolymer (or ester thereof). Suitable copolymers can have any weight average molecular weight that is functional, but in one embodiment, can be from 5,000 Mw to 20,000 Mw. Further, the polymer-encapsulated, acid-sensitive pigment colorant can be encapsulated by a copolymer having an acid number from 100 to 220 mg KOH/g, or in another embodiment, from 150 to 200 mg KOH/g.

Further, the use of polymer-encapsulated pigments can contribute to the acid-sensitivity described previously which is in accordance with embodiments of the present invention. For example, acid-sensitive polymers used to encapsulate pigments are typically more likely to crash, destabilize, or precipitate when printed on plain paper (which is typically acidified to some degree). Pigments with covalently attached polymeric dispersants or covalently attached small molecules are often less likely to readily precipitate on plain paper than the encapsulated pigments described herein. In one embodiment, the polymer encapsulated, acid-sensitive pigment colorant can be configured to flocculate in solution at least at pH 6 and below, and more typically, at least at pH 5 and below. As these pigments tend to flocculate at acidic pH levels, the ink can be kept about pH 7.5-8, and often can be from pH 8-10. Once printed on plain paper, the acidic nature of the paper can readily destabilize the acid-sensitive pigment colorant on the surface, thereby providing improved image quality compared to more acid-stable pigments.

It should be noted that though at least one ink of a given ink-jet ink set include a copolymeric dispersant coated on the pigment, other pigments in a given ink-jet ink set do not have to be similarly configured. For example, other pigments can merely be ionic in nature, such as those that have an ionic charge at the surface, e.g., small molecule-modified pigment surfaces, polymeric groups attached pigment surfaces, etc.

As described previously, a liquid vehicle can be used to carry the pigment solids, as well as other solids that may be present in the ink-jet ink compositions of the present invention. More specifically, the liquid vehicle can include water, and from 5 wt % to 35 wt % total organic solvent content, along with other optional liquid components. With respect to the total organic co-solvent content, co-solvents for use in the present invention include, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of co-solvents that are preferably employed in the practice of this invention include, but are not limited to, 1,5-pentanediol, 2-pyrrolidone, EG-2, Liponic ethylene glycol 1 (LEG-1), Liponic ethylene glycol 7 (LEG-7), 2-methyl-2,4-pentanediol, 2-methyl-1,3-propanediol, 1,2-hexanediol, 2-ethyl-2-hydroxymethyl-1,3-propanediol, diethylene glycol, 3-methoxybutanol, and 1,3-dimethyl-2-imidazolidinone. Co-solvents can be added to reduce the rate of evaporation of water in the ink to minimize clogging or other properties of the ink such as viscosity, pH, surface tension, optical density, and print quality. Various buffering agents, such as TRIS buffer or MOPS buffer, can also be optionally used in the ink-jet ink compositions of the present invention.

In another aspect of the present invention, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.05 wt % to about 2 wt %.

In one aspect of the present invention, the ink-jet ink compositions can be substantially free of surfactants. However, typically, such components can be used and may include standard water-soluble surfactants such as fluorinated surfactants, alkyl polyethylene oxides, alkyl phenyl polyethylene oxides, polyethylene oxide (PEO) block copolymers, acetylenic PEO, PEO esters, PEO amines, PEO amides, and dimethicone copolyols. If used, surfactants can be present at from 0.001 wt % to 10 wt % of the ink-jet ink composition, and in one embodiment, can be present at from 0.001 wt % to 0.1 wt %.

In an additional aspect of the present invention, binders can be included which act to secure the colorants on the substrate. Binders suitable for use in the present invention typically have a molecular weight of from about 100 to about 50,000 g/mole. Non-limiting examples include styrene-maleic anhydride copolymers, polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, styrene-acrylic acid-methacrylic acid copolymers, and derivatives and salts thereof. It should be noted that when multiple monomers are listed as part of a copolymer, such a designation is an open listing of monomers present in the copolymer. Other monomers, crosslinking agents, etc., can also be present. For example, a styrene-maleic anhydride copolymer includes at least these two monomers, and can include other monomers as well. Further, it should be noted that if the binder is in a particulate dispersed form, then it is not considered to be part of the liquid vehicle, but is considered to be carried by liquid vehicle.

EXAMPLES

The following examples illustrate the embodiments of the invention that are presently best known. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following example provides further detail in connection with what is presently deemed to be the most practical and preferred embodiments of the invention.

Example 1

Two magenta ink-jet inks were prepared, one with a triethanolamine (TEA) additive and one without, as shown in Table 1 below:

TABLE 1

Magenta ink-jet inks with and without triethanolamine

| | Ink | |
| --- | --- | --- |
| | Magenta Ink 1 | Magenta Ink 2 |
| [1]Polymer-encapsulated magenta pigment | 3.00 wt % | 3.00 wt % |
| 2EG | 6.00 | 6.00 |
| Proxel GXL | 0.15 | 0.15 |
| 2-pyrrolidone | 6.00 | 6.00 |
| LEG-1 | 3.00 | 3.00 |
| 1,2-Hexanediol | 7.00 | 7.00 |
| Zonyl FSO | 0.19 | 0.19 |
| Surfynol CT-111 | 0.65 | 0.65 |
| Glycerol | 5.00 | 5.00 |
| [2]Binder | 1.00 | 1.00 |
| Triethanolamine | — | 2.00 |
| Water | Balance | Balance |

Ink adjusted with KOH to pH 9.2
[1]Polymer of pigment is an acid-sensitive styrene-acrylic acid-methacrylic acid copolymer - Acid Number 155
[2]Styrene-acrylic acid-methacrylic acid-butyl acrylate copolymer (5,000 Mw to 10,000 Mw)

Example 2

Two yellow ink-jet inks were prepared, one with a triethanolamine (TEA) additive and one without, as shown in Table 2 below:

TABLE 2

Yellow ink-jet inks with and without triethanolamine

| | Ink | |
| --- | --- | --- |
| | Yellow Ink 1 | Yellow Ink 2 |
| [1]Polymer-encapsulated yellow pigment | 4.65 wt % | 4.65 wt % |
| 2EG | 6.00 | 6.00 |
| Proxel GXL | 0.15 | 0.15 |
| 2P | 6.00 | 6.00 |
| LEG-1 | 3.00 | 3.00 |
| 1,2-Hexanediol | 7.00 | 7.00 |
| Zonyl FSO | 0.19 | 0.19 |
| Surfynol CT-111 | 0.65 | 0.65 |
| Glycerol | 5.00 | 5.00 |
| [2]Binder | 1.00 | 1.00 |

TABLE 2-continued

Yellow ink-jet inks with and without triethanolamine

| | Ink | |
|---|---|---|
| | Yellow Ink 1 | Yellow Ink 2 |
| Triethanolamine | 0.00 | 2.00 |
| Water | Balance | Balance |

Ink adjusted with KOH to pH 9.2
[1]Polymer of pigment is an acid-sensitive styrene-acrylic acid-methacrylic acid copolymer - Acid Number 155
[2]Styrene-acrylic acid-methacrylic acid-butyl acrylate copolymer (5,000 Mw to 10,000 Mw)

Example 3

Seven squares of each of the four inks set fourth in Example 1 (Magenta Inks 1 and 2) and Example 2 (Yellow Ink 1 and 2) were printed on Pictorico commercial glossy media at various saturation levels ranging from medium saturation (Saturation Level 1) to very heavy saturation (Saturation Level 7). This data is provided as gloss loss is typically more pronounced at the heavier saturation levels. The gloss data is shown in Tables 3A and 3B as follows:

TABLE 3A

Gloss of Magenta Inks 1 and 2 printed alone

| Square | [3]Gloss of Magenta Ink 1 (0 wt % triethanolamine) | [3]Gloss of Magenta Ink 2 (2 wt % triethanolamine) |
|---|---|---|
| 1 | 74.0 | 74.8 |
| 2 | 70.3 | 73.3 |
| 3 | 69.3 | 75.4 |
| 4 | 67.6 | 75.6 |
| 5 | 67.4 | 76.6 |
| 6 | 67.8 | 76.2 |
| 7 | 69.6 | 76.7 |

[3]Values approximated to within ±3 (noise level)

TABLE 3B

Gloss of Yellow Inks 1 and 2 printed alone

| Square | [3]Gloss of Yellow Ink 1 (0 wt % triethanolamine) | [3]Gloss of Yellow Ink 2 (2 wt % triethanolamine) |
|---|---|---|
| 1 | 58.6 | 56.4 |
| 2 | 59.3 | 57.0 |
| 3 | 59.9 | 59.2 |
| 4 | 60.3 | 61.8 |
| 5 | 61.1 | 66.9 |
| 6 | 61.8 | 72.3 |
| 7 | 62.3 | 76.0 |

[3]Values approximated to within ±3 (noise level)

As can be seen by Tables 3A and 3B, particularly at the heavier ink saturation levels, significant gloss improvement is achieved due to the presence of the triethanolamine additive.

Example 4

A 50/50 weighted blend of Magenta Ink 1 (Example 1) and Yellow Ink 1 (Example 2) were printed in seven squares on Pictorico commercial glossy media at various saturation levels ranging from medium saturation (Saturation Level 1) to very heavy saturation (Saturation Level 7). This sample of squares represented ink blends that did not include triethanolamine in either ink. Additionally, a 50/50 weighted blend of Magenta Ink 2 (Example 1) and Yellow Ink 2 (Example 2) were printed in seven squares on Pictorico commercial glossy media paper at various saturation levels ranging again from medium saturation (Saturation Level 1) to very heavy saturation (Saturation Level 7). This sample of squares represented ink blends that included triethanolamine in the inks. This data is shown in Table 4 as follows:

TABLE 4

Gloss of ink blends

| Square | [3]Gloss of Magenta Ink 1/ Yellow Ink 1 blend (0 wt % triethanolamine) | [3]Gloss of Magenta Ink 2/ Yellow Ink 2 blend (2 wt % triethanolamine) |
|---|---|---|
| 1 | 59.2 | 64.2 |
| 2 | 57.2 | 64.8 |
| 3 | 55.5 | 68.2 |
| 4 | 55.3 | 71.1 |
| 5 | 54.7 | 74.2 |
| 6 | 54.1 | 73.5 |
| 7 | 55.1 | 70.5 |

[3]Values approximated to within ±3 (noise level)

As can be seen by comparing Tables 3A and 3B to Table 4, two otherwise glossy inks lose some gloss when blended together. Further, the addition of the triethanolamine to one or both of the inks ameliorates that gloss loss, and in some cases, brings the gloss levels back up to within the noise level of inks that are printed alone with triethanolamine. It should be noted that this example is merely exemplary, and similar results have been verified with other ink-jet inks of different colors.

Example 5

Three polymer-encapsulated and acid-sensitive pigment dispersions in the form of diluted inks (Cyan, Magenta, and Yellow) having a pH of about 7-8 were acidified with 0.00625 M HCl until the pH was about 2.5. For comparative purposes, three acid-stable pigment dispersions in the form of diluted inks (Epson R800-Cyan, Magenta, and Yellow) having an initial pH of about 7-8 were also similarly acidified. UV absorbance was measured to determine whether the pigment flocculated upon the addition of the acid. The results are provided in Table 5 as follows:

TABLE 5

Change in UV-Vis (in solution) absorbance when 0.00625 M HCl is added to diluted ink

| | Color | [4]Acid-Stable Pigment-containing Inks (Epson R800) | [4]Acid-sensitive Pigment-containing Inks |
|---|---|---|---|
| Initial UV-Vis absorbance at 330 nm | Cyan | 0.72 | 0.84 |
| UV-Vis absorbance at 330 nm at 10 min | Cyan | 0.72 | 0.29 |
| % decrease in UV-Vis after acid addition | Cyan | 0% | 65% |
| Initial UV-Vis absorbance at 276 nm | Magenta | 1.06 | 1.29 |
| UV-Vis absorbance at 276 nm at 10 min | Magenta | 1.05 | 1.11 |
| % decrease in UV-Vis after acid addition | Magenta | 1% | 14% |
| Initial UV-Vis absorbance at 465 nm | Yellow | 0.61 | 0.73 |

TABLE 5-continued

Change in UV-Vis (in solution) absorbance when
0.00625 M HCl is added to diluted ink

| | Color | [4]Acid-Stable Pigment-containing Inks (Epson R800) | [4]Acid-sensitive Pigment-containing Inks |
|---|---|---|---|
| UV-Vis absorbance at 465 nm at 10 min | Yellow | 0.61 | 0.54 |
| % decrease in UV-Vis after acid addition | Yellow | 0% | 26% |

[4]Inks diluted with deionized water to about 0.05%

As can be seen in Table 5 above, the diluted Epson R800 inks were very stable in the presence of acid, whereas the diluted Acid-sensitive Pigment-containing Inks prepared in accordance with embodiments of the present invention (polymer-encapsulated, acid sensitive) became more agglomerated or flocculated upon the addition of acid, as evidenced by the less efficient absorbance of UV light after addition of the acid. In fact, the Acid-sensitive Pigment-containing Inks became quite unstable in solution at pH of about 5-6 (and lower), whereas the Epson R800 inks remained acid-stable at pH 2.5. As mentioned herein, it has been observed that Acid-sensitive Pigment-containing Inks have objectively better color and image quality when printed on plain paper then highly stable pigments (e.g., Epson R800).

Example 6

Three polymer-encapsulated and acid-sensitive pigment dispersions in the form of diluted inks (Cyan, Magenta, and Yellow) having a pH of about 7-8 were acidified with 0.00625 M HCl until the pH was about 2.5. For comparative purposes, three polymer-encapsulated and acid-stable pigment dispersions in the form of diluted inks (Cyan, Magenta, and Yellow) having an initial pH of about 7-8 were also similarly acidified. UV absorbance was measured to determine whether the pigment flocculated upon the addition of the acid. Further, undiluted inks were also printed on plain paper and tested for chroma. The results are provided in Table 6 as follows:

TABLE 6

Change in UV-Vis (in solution) absorbance when
0.00625 M HCl is added to diluted ink and chroma of undiluted ink

| | Color | [4]Acid-Stable Pigment-containing Inks | [4]Acid-sensitive Pigment-containing Inks |
|---|---|---|---|
| Initial UV-Vis absorbance at 330 nm | Cyan | 0.78 | 0.84 |
| UV-Vis absorbance at 330 nm at 10 min | Cyan | 0.76 | 0.29 |
| % decrease in UV-Vis after acid addition | Cyan | 3% | 65% |
| [5]Chroma of undiluted ink on HP Plain Paper (2 wt % pigment) | Cyan | 50 | 59 |
| Initial UV-Vis absorbance at 276 nm | Magenta | 1.26 | 1.38 |
| UV-Vis absorbance at 276 nm at 10 min | Magenta | 1.22 | 0.67 |
| % decrease in UV-Vis after acid addition | Magenta | 3% | 51% |
| [5]Chroma of undiluted ink on HP Plain Paper (1.3 wt % pigment) | Magenta | 59 | 69 |
| Initial UV-Vis absorbance at 465 nm | Yellow | 0.68 | 0.73 |
| UV-Vis absorbance at 465 nm at 10 min | Yellow | 0.68 | 0.54 |
| % decrease in UV-Vis after acid addition | Yellow | 0% | 26% |
| [5]Chroma of undiluted ink on HP Plain Paper (4 wt % pigment) | Yellow | 73 | 93 |

[4]Inks diluted with deionized water to about 0.05%
[5]Chroma using undiluted ink printed at medium density (Max Chroma)

As can be seen in Table 6 above, the Acid-Stable Pigment-containing Inks were very stable in the presence of acid, whereas the Acid-sensitive Pigment-containing Inks prepared in accordance with embodiments of the present invention (polymer-encapsulated, acid sensitive) became more agglomerated or flocculated upon the addition of acid, as evidenced by the less efficient absorbance of UV light after addition of the acid. In fact, the Acid-sensitive Pigment-containing Inks became quite unstable in solution at pH of about 5-6 (and lower), whereas the Acid-stable Pigment-containing Inks remained acid-stable at pH 2.5. As mentioned herein, it has been observed that acid-sensitive pigments have objectively better color and image quality when printed on plain paper then highly stable pigments. This is evidenced in part by the chroma is values also shown in Table 6, where in each case, the presence of the acid-sensitive pigments as opposed to the acid-stable pigments produced improved chroma values.

It is to be understood that the above-referenced embodiments and arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention.

What is claimed is:

1. An ink-jet ink formulated for printing on plain paper and glossy coated media, comprising:
    a liquid vehicle including water, an organic solvent, and an organic amine;
    a polymer-encapsulated, acid-sensitive pigment colorant dispersed in the liquid vehicle, and
    a polymer binder prepared using at least one of the same monomers used to prepare the polymer-encapsulated, acid-sensitive pigment colorant;
    wherein the ink-jet ink provides an increase of at least 5 gloss units over a comparative ink, said comparative ink having the same components of the ink-jet ink but without the organic amine.

2. The ink-jet ink of claim 1, wherein the organic amine is selected from the group consisting of triethanolamine, 2-amino-2-methyl-1-propanol, 2-dimethylamino-2-methyl-1-propanol, diethanolamine, and mixtures thereof.

3. The ink-jet ink of claim 1, wherein the organic amine is triethanolamine.

4. The ink-jet ink of claim 1, wherein the organic amine is present in the ink-jet ink at from 0.1 wt % to 5 wt %.

5. The ink-jet ink of claim 1, wherein the organic amine is present in the ink-jet ink at from 0.2 wt % to 2 wt %.

6. The ink-jet ink of claim 1, wherein the polymer encapsulated, acid sensitive pigment colorant is encapsulated with a styrene-acrylic acid-methacrylic acid copolymer, or ester thereof.

7. The ink-jet ink of claim 6, wherein the styrene-acrylic acid-methacrylic acid copolymer, or esters thereof, has a weight average molecular weight from 5,000 Mw to 20,000 Mw.

8. The ink-jet ink of claim 1, wherein the polymer-encapsulated, acid-sensitive pigment colorant is encapsulated by a copolymer having an acid number from 100 to 220 mg KOH/g.

9. The ink-jet ink of claim 1, wherein the polymer-encapsulated, acid-sensitive pigment colorant is encapsulated by a copolymer having an acid number from 150 to 200 mg KOH/g.

10. The ink-jet ink of claim 1, wherein the polymer encapsulated, acid-sensitive pigment colorant flocculates in solution at pH 6 and below.

11. The ink-jet ink of claim 1, wherein the polymer encapsulated, acid-sensitive pigment colorant destabilizes when printed on plain paper such that it remains on a surface of the plain paper.

12. An ink-jet ink set formulated for printing on plain paper and glossy coated media, comprising
   a) a first ink-jet ink comprising the ink-jet ink of claim 1; and
   b) a second ink-jet ink, comprising a pigment dispersion that includes an ionic pigment colorant or a pigment colorant associated with an ionic pigment dispersant.

13. The ink-jet ink set of claim 12, wherein the pigment dispersion of the second ink-jet ink is a polymer encapsulated, acid sensitive pigment colorant.

14. The ink-jet ink set of claim 12, wherein the second ink jet ink also includes an organic amine.

15. The ink-jet ink set of claim 12, wherein the organic amine is selected from the group consisting of triethanolamine, 2-amino-2-methyl-1-propanol, 2-dimethylamino-2-methyl-1-propanol, diethanolamine, and mixtures thereof.

16. The ink-jet ink set of claim 12, wherein the organic amine is triethanolamine.

17. The ink-jet ink set of claim 12, wherein the organic amine is present in the first ink-jet ink at from 0.1 wt % to 5 wt %.

18. The ink-jet ink set of claim 12, wherein the organic amine is present in the first ink-jet ink at from 0.2 wt % to 2 wt %.

19. The ink-jet ink set of claim 12, wherein the polymer encapsulated, acid sensitive pigment colorant is encapsulated with a styrene-acrylic acid-methacrylic acid copolymer, or ester thereof.

20. The ink-jet ink set of claim 19, wherein the styrene-acrylic acid-methacrylic acid copolymer, or ester thereof, has a weight average molecular weight from 5,000 Mw to 20,000 Mw.

21. The ink-jet ink set of claim 12, wherein the polymer encapsulated, acid-sensitive pigment colorant flocculates in solution at pH 6 and below.

22. The ink-jet ink set of claim 12, wherein the polymer encapsulated, acid-sensitive pigment colorant precipitates when printed on plain paper.

23. A method of printing images, comprising:
   a) jetting a first ink-jet ink onto a media substrate, said first ink-jet ink, comprising:
      i) a liquid vehicle including water, an organic solvent, and an organic amine, and
      ii) a polymer-encapsulated, acid-sensitive pigment colorant dispersed in the liquid vehicle; and
   b) jetting a second ink-jet ink onto the media substrate such that the first ink jet ink and the second ink-jet ink become blended on the media substrate, wherein the second ink-jet ink includes an ionic pigment colorant or a pigment colorant associated with an ionic pigment dispersant.

24. The method of claim 23, wherein the pigment dispersion of the second ink-jet ink is a polymer encapsulated, acid sensitive pigment colorant.

25. The method of claim 23, wherein the second ink-jet ink includes an organic amine.

26. The method of claim 23, wherein the organic amine is selected from the group consisting of triethanolamine, 2-amino-2-methyl-1-propanol, 2-dimethylamino-2-methyl-1-propanol, diethanolamine, and mixtures thereof.

27. The method of claim 23, wherein the organic amine is triethanolamine.

28. The method of claim 23, wherein the organic amine is present in the first ink-jet ink at from 0.1 wt % to 5 wt %.

29. The method of claim 23, wherein the organic amine is present in the first ink-jet ink at from 0.2 wt % to 2 wt %.

30. The method of claim 23, wherein the polymer encapsulated, acid sensitive pigment colorant is encapsulated with a styrene-acrylic acid-methacrylic acid copolymer, or ester thereof.

31. The method of claim 30, wherein the styrene-acrylic acid-methacrylic acid copolymer, or ester thereof, has a weight average molecular weight from 5,000 Mw to 20,000 Mw.

32. The method of claim 23, wherein the polymer encapsulated, acid-sensitive pigment colorant flocculates in solution at pH 6 and below.

33. The method of claim 23, wherein the polymer encapsulated, acid-sensitive pigment colorant precipitates when printed on plain paper.

34. The ink-jet ink of claim 1, wherein the ink-jet ink provides an increase of at least 10 gloss units over a comparative ink, said comparative ink having the same components of the ink-jet ink but without the organic amine.

35. The ink-jet ink of claim 1, wherein the ink-jet ink provides an increase of at least 15 gloss units over a comparative ink, said comparative ink having the same components of the ink-jet ink but without the organic amine.

* * * * *